(12) United States Patent
Osborne et al.

(10) Patent No.: US 7,695,046 B2
(45) Date of Patent: Apr. 13, 2010

(54) VISOR ASSEMBLY FOR A VEHICLE

(75) Inventors: Chris Osborne, Efland, NC (US); Michael Tsay, Irvine, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/137,075

(22) Filed: Jun. 11, 2008

(65) Prior Publication Data

US 2009/0079224 A1   Mar. 26, 2009

Related U.S. Application Data

(63) Continuation-in-part of application No. 29/295,086, filed on Sep. 21, 2007, now Pat. No. Des. 597,912.

(51) Int. Cl.
*B60J 3/02* (2006.01)

(52) U.S. Cl. .............. 296/97.11; 296/97.13; 244/118.5

(58) Field of Classification Search ............. 296/97.9, 296/97.11, 97.12, 97.13; 160/DIG. 3, 370.21; 244/118.5
See application file for complete search history.

(56) References Cited

U.S. PATENT DOCUMENTS

| | | | | |
|---|---|---|---|---|
| 1,461,289 A | * | 7/1923 | Primrose | 296/97.11 |
| 1,814,500 A | * | 7/1931 | Summerbell | 248/285.1 |
| 1,888,703 A | * | 11/1932 | Summerbell | 248/298.1 |
| 1,941,032 A | * | 12/1933 | Knowles | 248/276.1 |
| 2,932,539 A | * | 4/1960 | Galbraith | 296/97.11 |
| 2,978,274 A | * | 4/1961 | Ordman | 296/97.11 |
| 3,403,937 A | * | 10/1968 | Quaine | 296/97.11 |
| 3,865,428 A | * | 2/1975 | Chester | 296/152 |
| 3,948,554 A | * | 4/1976 | Barbee | 296/97.6 |
| 5,056,854 A | * | 10/1991 | Rosen | 296/97.11 |
| 5,419,604 A | * | 5/1995 | Clark | 296/97.9 |
| 5,465,776 A | * | 11/1995 | Mirza | 160/368.1 |
| 5,538,310 A | * | 7/1996 | Frankhouse et al. | 296/97.4 |
| 5,851,046 A | * | 12/1998 | Kalkman et al. | 296/97.11 |
| 6,007,135 A | * | 12/1999 | Alves | 296/97.9 |
| 6,328,370 B1 | * | 12/2001 | Kim | 296/97.11 |
| 2006/0138799 A1 | * | 6/2006 | Wang et al. | 296/97.11 |
| 2008/0088150 A1 | * | 4/2008 | Delphia | 296/97.11 |

OTHER PUBLICATIONS

U.S. Design Patent U.S. Appl. No. 29/295,086, filed Sep. 21, 2007.
Notice of Allowance mailed Apr. 3, 2009 from U.S. Design Patent U.S. Appl. No. 29/295,086.

* cited by examiner

*Primary Examiner*—Jason S Morrow
(74) *Attorney, Agent, or Firm*—Plumsea Law Group, LLC; Mark E. Duell

(57) ABSTRACT

A visor for shielding the interior of a vehicle from the light or glare from a light source includes a visor that can be rotated about an axis from a stowed position to a shielding position. The visor may also be translated along a track so that the placement of the visor along the length of a large window may be chosen with precision.

23 Claims, 8 Drawing Sheets

VISOR ASSEMBLY FOR A VEHICLE

CROSS-REFERENCE TO RELATED APPLICATION

This application is a continuation-in-part of U.S. application Ser. No. 29/295,086, entitled "Sunvisor", and filed on Sep. 21, 2007, now U.S. Pat. No. D,597,912 which patent application is hereby incorporated by reference in its entirety.

BACKGROUND OF THE INVENTION

1. Field of the Invention

The present invention relates generally to a visor. More specifically, the invention relates to a visor that can be moved across a window in addition to being rotated in front of or away from a window.

2. Description of Related Art

Drivers or pilots of vehicles can be momentarily blinded or otherwise have their view obstructed by direct light or glare from light. The light source may be the sun or artificial lights for example street lights, headlights, spotlights, or the like. These moments of blindness can be dangerous, perhaps even leading to accidents, as the operation of many vehicles requires the driver or pilot to be able to visually detect the path to be followed, i.e., the road, waterway, or skyway, and obstructions in that path.

Visors have long been used in vehicles to help protect drivers and pilots from these moments of blindness. Conventional visors are made of opaque material and rotate about a fixed axis, with one end of the axis removably attached to the vehicle and the other end of the axis rotatably fixed to the vehicle. The visor may be rotated to a first, stowed position where the window is completely unobstructed by the visor. The visor may also be rotated to a second, shielding position where the window partially blocks the window to block the blinding or glaring light from passing through the window to inhibit the vision of the driver or pilot. In some instances, the removably attached end of the axis visor may be pulled free from the vehicle so that the visor may be rotated about the rotatably attached end of the visor to shield a side window. Additionally, the visor may include an extendable portion that the user may draw out of the main portion of the visor to shield a greater portion of the window.

If the visor is made of an opaque material, then the view through the window is blocked in addition to the light source and/or glare. Some visors may be made of a tinted translucent or substantially transparent material, similar to the material for sunglasses, so that the view of the path is not blocked when the light source and/or glare is blocked. Some opaque visors are made smaller than translucent visors so that a smaller total area of the field of view is blocked when the visor is being used.

When using a vehicle, the vehicle typically does not follow a straight line path with respect to a light source as light sources, for example the sun and lights from other vehicles, move over time. Therefore, the position of the light source with respect to the vehicle may change. A visor may effectively block the light source and/or glare at an initial time, but when the position of the light source changes or orientation of the vehicle changes, the visor may be able to only partially block the blinding or glaring light. This effect is particularly problematic in flying vehicles, where even minor changes in the relative positions of the sun and the vehicle may shift the blinding spot and/or glare spot. This effect is also enhanced when a pilot or operator is using the sun for navigational purposes.

Therefore, there exists a need in the art for a visor capable of being positioned at multiple locations along the field of view so that the placement of the visor may be more precisely selected.

SUMMARY OF THE INVENTION

A visor for shielding the interior of a vehicle from direct exposure to a light source or glare from a light source is disclosed. The light source may be the sun. The visor is rotatable about a first axis so that the visor may be moved in front of a window and away from the window. The visor is also translatable, for example along a track, so that the position of the visor along the length or width of the window or combination of windows may be selected with precision.

In one aspect, the invention provides a visor assembly for a vehicle comprising a visor configured to shield an interior of the vehicle from a light, a track extending along at least a portion of a window of the vehicle, and a connector configured to associate the visor with the track, the connector configured to rotate on the track and translate along the track.

In another aspect, the invention provides a visor for a vehicle comprising a panel configured to shield an interior of the vehicle from a light, the visor configured to be rotatably and slidingly attached to a track so that a shielding position of the visor may be selected by a user of the vehicle.

In another aspect, the invention provides a vehicle comprising a window, a first visor assembly comprising a visor configured to shield an interior of the vehicle from a light, a track that extends at least partially along a length of the window, and a connector that rotatably and slidingly associates the visor with the track.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A visor for shielding the interior of a vehicle from the light or glare from a light source includes a visor that can be rotated about an axis from a stowed position to a shielding position. The visor may also be translated along a track so that the placement of the visor along the length of a large window may be chosen with precision. The term "vehicle" as used throughout the specification and claims refers to any moving vehicle that is capable of carrying one or more human occupants. The term vehicle includes, but is not limited to cars, trucks, vans, minivans, SUVs, motorcycles, scooters, boats, personal watercraft, dirigibles, bicycles, gliders, helicopters, and airplanes.

While the visor may be used in any vehicle, the visor is particularly well suited for use in aircraft, for example an airplane, as airplanes have large windows, few obstructions between the airplane and the sun, and small changes in the direction in which the airplane is moving may result in dramatic changes in the location of the light or glare entering the cockpit of the airplane. This effect may be particularly pronounced when the airplane is small, for example a propeller plane or a jet that carries less than 10 passengers.

In this description, "window" is used generally to refer to any transparent, semi-transparent, or translucent material in the vehicle through which the operator may see the surrounding environment, for example a window, port, windshield, windscreen, or the like.

Figure 1:
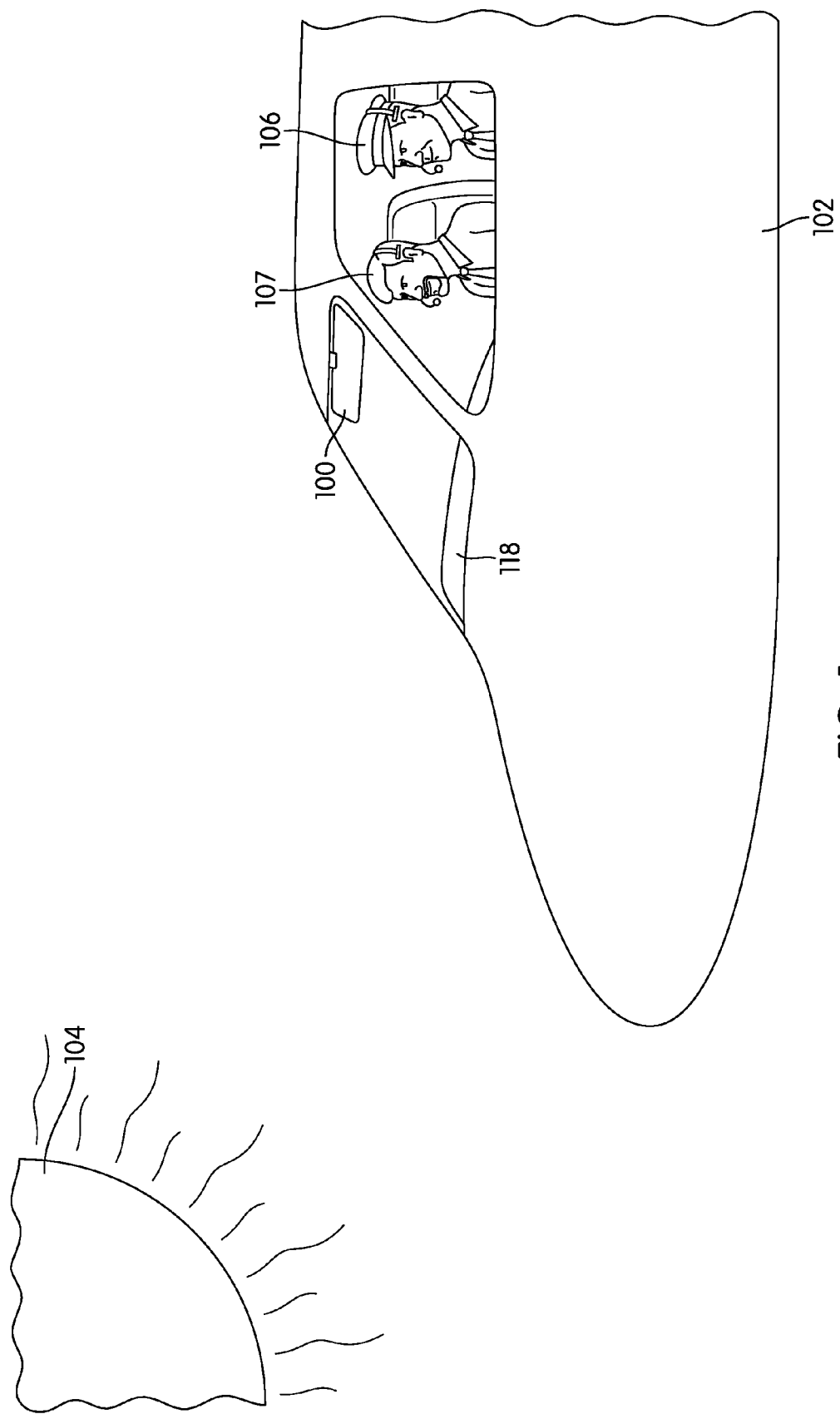
FIG. 1 is a schematic drawing of an embodiment of a visor assembly according to the invention shown in use in an airplane.

FIG. 1 is a schematic view of an operator compartment, in this instance, the cockpit of an airplane 102 flying in a sunny sky. The sun 104 may be shining into the cockpit, potentially blinding a pilot 106 and/or co-pilot 107. Pilot 106 and/or co-pilot 107 may be prevented from seeing an obstruction in the flight path, for example another plane. Such a situation is particularly problematic when the airplane is being guided without instrumentation, i.e., visually. Additionally, glare from sun 104 may shine or be reflected onto an instrument panel, for example front instrument panel 118, causing a glare sufficient to prevent pilot 105 and/or co-pilot 107 from effectively viewing one or more instruments or readings. Therefore, airplane 102 is provided with a visor assembly 100 to shield pilot 106, co-pilot 107, and/or front instrument panel 118 from direct or indirect exposure to light from sun 104.

Figure 2:
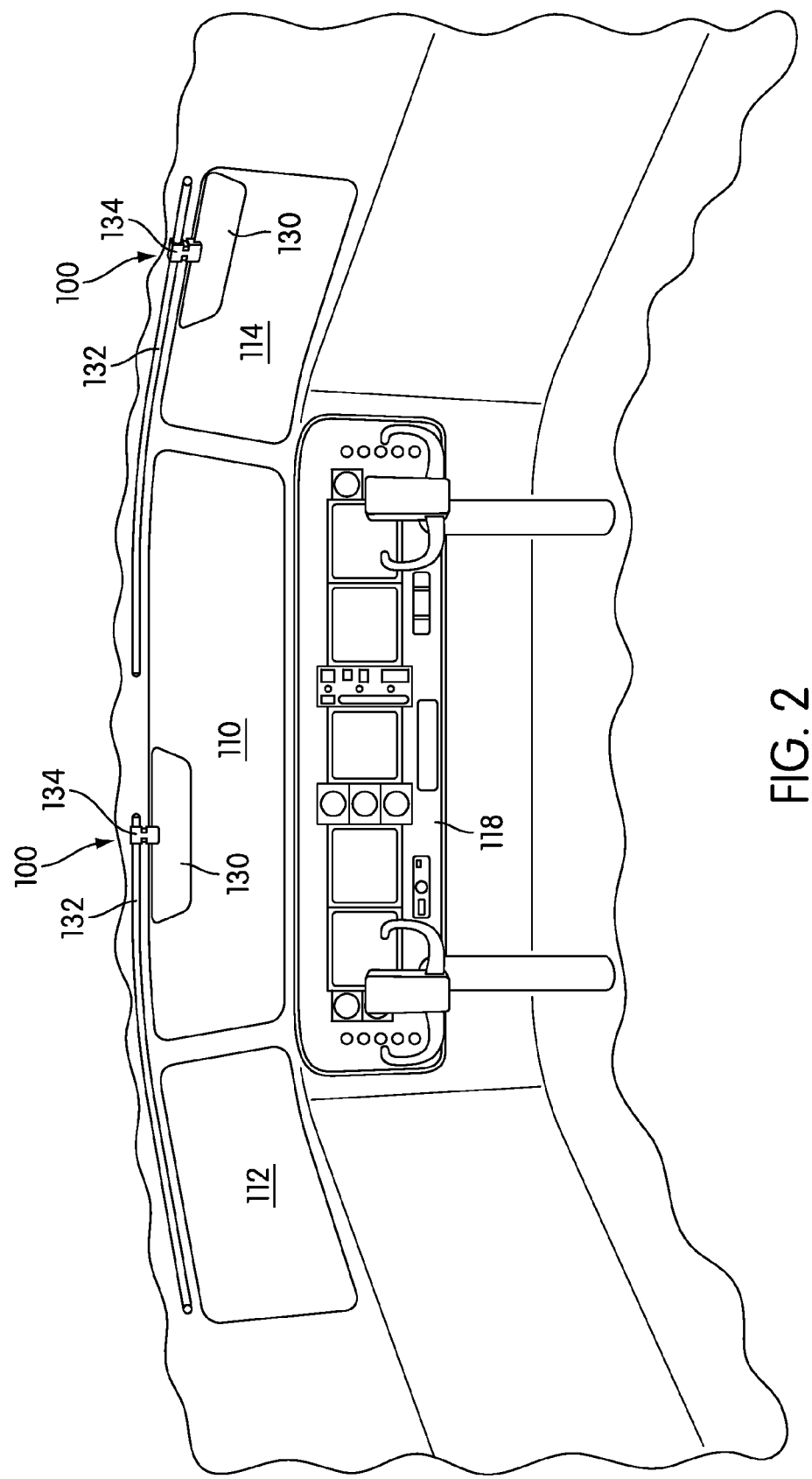
FIG. 2 is a schematic view of the windows of a cockpit of an airplane showing an embodiment of the visor system according to the invention.

FIG. 2 shows an embodiment of an interior of a cockpit as seen from behind the pilot and/or co-pilot seat. The cockpit in this embodiment includes front instrument panel 118 and a front window 110 positioned above front instrument panel 118. A pilot side window 112 is positioned on a first side of front window 110, and a co-pilot side window 114 is positioned on a second side of front window 110. In other embodiments, the number and positioning of windows may differ. In many vehicles, particularly in airplanes, the windows provide a large field of view. In some vehicles, the occupants may be provided a field of view of 180 degrees or more. Further, the windows of a vehicle typically wrap around the field of view in an arcuate shape, for example by providing separate front window and side windows that meet at an angle or inflection point, as shown in the figures, by providing a single window formed as a bubble with a spherical or partial spherical shape, or by providing a flatter front window with side wings that extend away from the front window at an angle or inflection point. Therefore, the windows form a substantial portion of the front end of the airplane. As such, sun 104 may be able to shine into the cockpit at a number of different angles through any of the windows provided in the airplane. A conventional visor may only be able to shield a small portion of the large window area. Furthermore, because of the large windows in the front of the airplane, even a small change in the vector of the airplane may dramatically shift the relative position of sun 104 and airplane 102. Therefore, even if a conventional visor were able to shield the pilot and/or co-pilot from the light source and/or glare initially, the conventional visor may not be able to do so after the vector of the airplane has been shifted.

Airplane 102 is therefore provided with a visor assembly 100 that is configured to shield, selectively, a large portion of the window area of airplane 102. As shown in FIG. 2, visor assembly 100 generally includes a visor 130, a track 132, and a sliding connector 134 slidably attaching visor 130 to track 132. In one embodiment, as shown in FIG. 2, two visor assemblies 100 are provided: a first assembly on the pilot side of the cockpit and a second assembly on the co-pilot side of the cockpit. In some embodiments, the pilot side assembly may be different from the co-pilot side assembly, for example when the cockpit is asymmetrical. However, in the embodiment shown in the figures, the pilot side assembly and the co-pilot side assembly are substantially identical. For the sake of clarity, only one assembly is described herein, although the principles of structure and operation remain substantially similar for both sides.

Visor 130 may be similar to visors known in the art, generally including a panel portion configured to shield an interior of the vehicle from a light or glare from the light. Like a conventional visor, visor 130 is able to rotate from a stowed position to a shielding position. However, visor 130 may also able to translate along the window length to be able to be moved in front of a greater number of positions along the length of the window area than a conventional visor, including being drawn around an angle or inflection point in the shape of the window.

Figure 3:
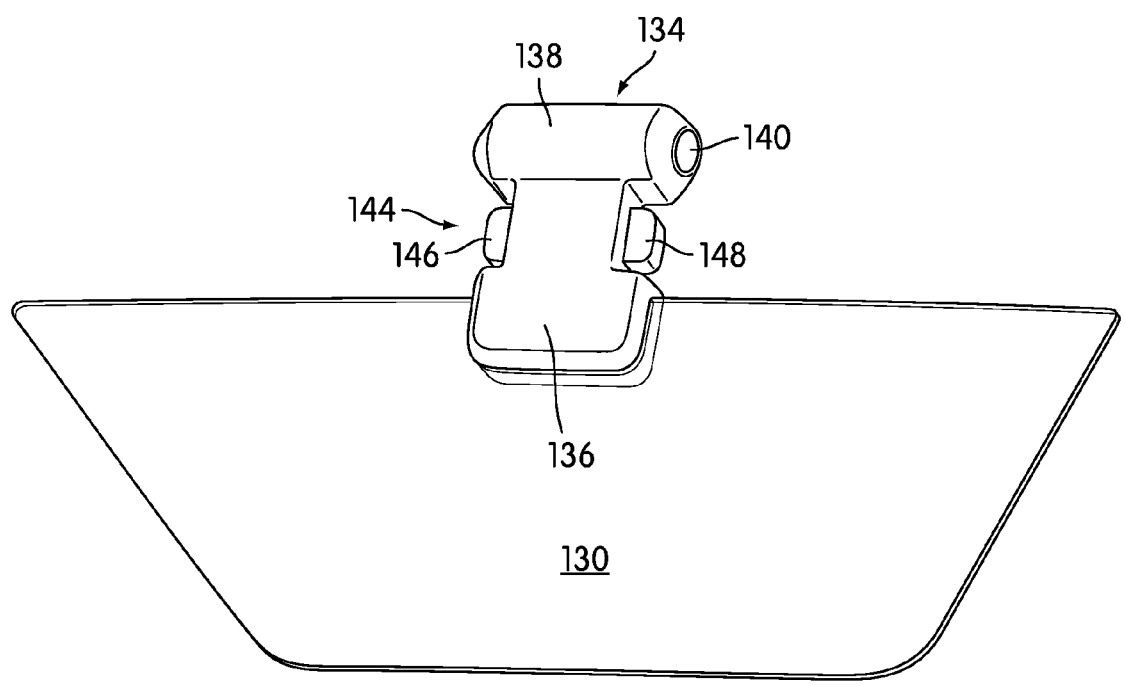
FIG. 3 is a front plan view of an embodiment of a visor and an attachment according to the invention.

Visor 130 is sized and shaped to be readily manually manipulated by the user while providing an obstruction to shield the interior of the cockpit from the light or glare from sun 104. Visor 130 may have any shape, but in some embodiments may have a quadrilateral shape, particularly a trapezoidal shape, as shown best in FIG. 3. Visor 130 may be made from any material known in the art and may be substantially transparent, translucent, or opaque. For example, visor 130 may be made from glass, plastic, vinyl, leather, metal, or a combination of these or other materials. In some embodiments, visor 130 may be a single, unitary piece of material cut, molded, or otherwise formed into the shape of visor 130. In other embodiments, visor 130 may be a composite, for example a sandwich. For example, visor 130 may be made from a piece of rigid or relatively inflexible material, for example a sheet of plastic or metal cut into the desired shape of visor 130, covered by a relatively flexible material, for example leather or vinyl. In other embodiments, visor 130 may be made of a relatively flexible piece of material, so that visor 130 may bend or deform in when moving around a corner or other angular change of track 132.

In the embodiments shown in the figures, visor 130 is translucent or substantially transparent. In such an embodiment, visor 130 preferably has a unitary construction, for example a single pane of tinted plastic, glass, or similar material. In other embodiments, visor 130 may include multiple pieces, for example a frame surrounding the periphery of a single pane of tinted plastic or glass. Unlike an opaque or nearly opaque visor which can block both the light or glare as well as a portion of the field of view, a translucent visor may not entirely block a portion of the field of view of pilot 106 and/or co-pilot 107 while still reducing the impact of the light or glare on pilot 106 and/or co-pilot 107. In some embodiments, the view through a first side of visor 130 may differ, even significantly, from the view through the other side of visor 130, giving visor 130 an optimal viewing direction. In such embodiments, pivoting the visor about a rotatable pivot point to move the visor from a position in front of the front window to a position in front of a side window may result in the occupants viewing the outside through a side that is not the optimal viewing direction. For example, visor 130 may include polarized material that polarizes efficiently when viewed through a first or correct side of the visor in an optimal viewing direction and less efficiently when viewed through a second or incorrect side of the visor through a suboptimal viewing direction.

Figure 7:
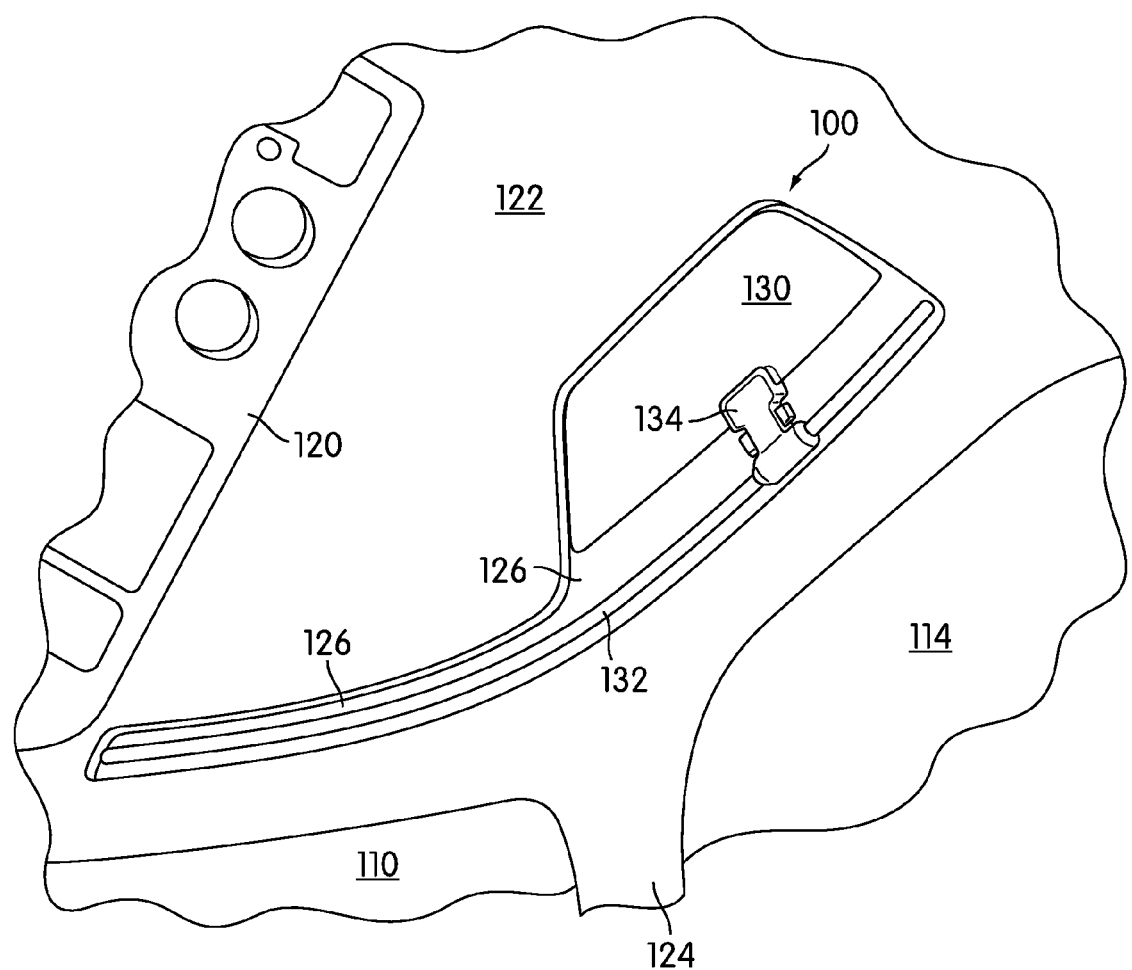
FIG. 7 is a partial view of a cockpit of an airplane with an embodiment of a visor system according to the invention shown in a stowed position.
Figure 8:
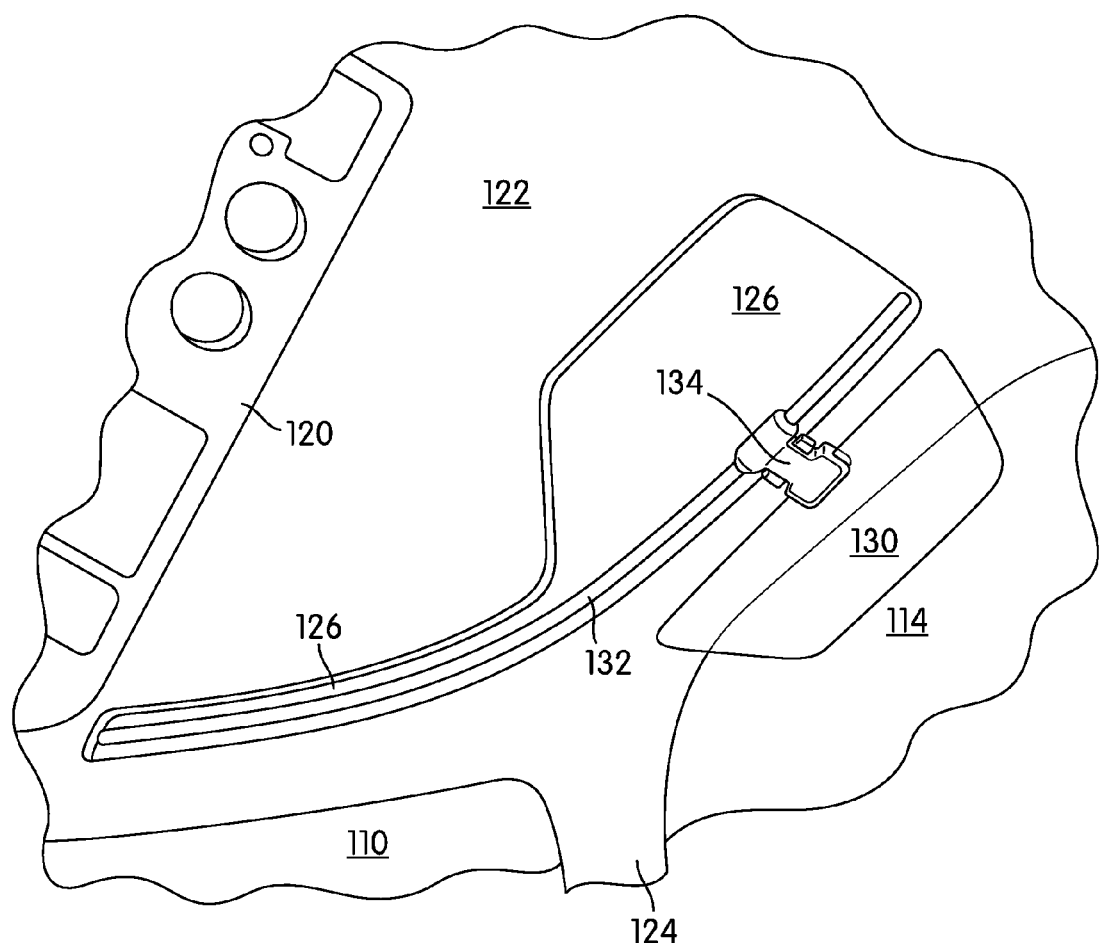
FIG. 8 is a partial view of a cockpit of an airplane with an embodiment of a visor system according to the invention shown in a first shielding position over a side window.
Figure 9:
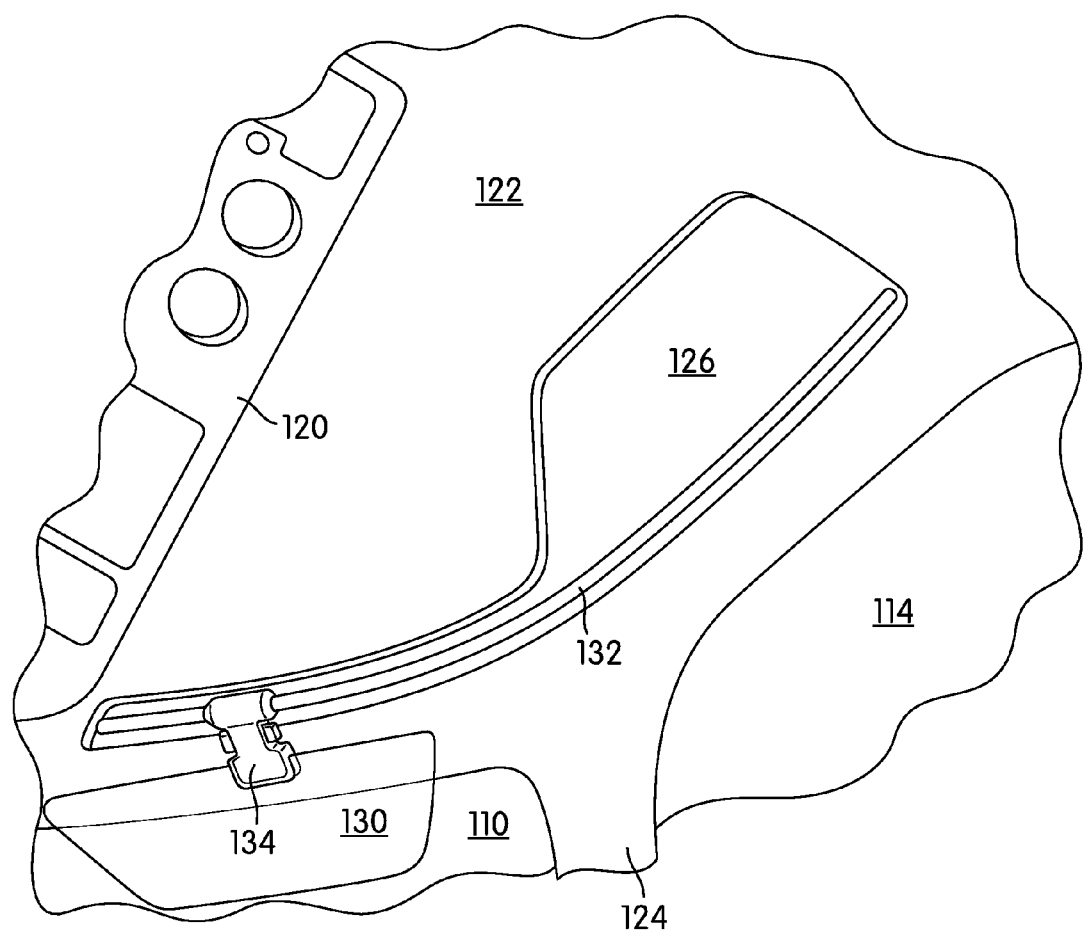
FIG. 9 is a partial view of a cockpit of an airplane with an embodiment of a visor system according to the invention shown in a second shielding position over a front window.

Track 132 may be any type of system along which visor 130 may be translated. In some embodiments, track 132 is configured to follow the arcuate shape of the windows. In some embodiments, track 132 spans the entire field of view provided by the windows, while in other embodiments, track 132 may span only a portion of the field of view. In the embodiment shown in the figures, track 132 is an elongated element, for example a rod, bar, strip, wire, cable, or similar element. Track 132 may have any cross-sectional shape, for example circular, polygonal, or the like. In some embodiments, track 132 may protrude from a surface of the interior of the cockpit. In other embodiments, track 132 may be flush with or recessed into the surface of the interior of the cockpit. In the embodiments shown in the figures, as best seen in FIGS. 7-9, track 132 is attached to a recessed portion 126 of a ceiling 122 of the cockpit. Track 132 may protrude slightly from the surface of recessed portion 126, but may not protrude beyond the surface of ceiling 122.

Track 132 may be made from any material capable of receiving visor 130. For example, track 132 may be made from metal, plastic, rubber, composite materials, or the like. Track 132 may be attached to ceiling 122 using any method known in the art, for example brackets, bolts, welding, with an adhesive, or the like. In some embodiments, track 132 may be co-formed with a panel of ceiling 122, particularly if ceiling 122 were formed from injection-molded panels. In some embodiments, track 132 may be smooth, with a uniform cross-section. In other embodiments, track 132 may include one or more indentations, protrusions, ridges, or the like to provide a guide for sliding visor 130 along track 132. In some embodiments, visor 130 may be translated along track 132 so that the same side of visor 130 faces the user when visor 130 is in a shielding position regardless of the position of visor 130 along track 132. In some embodiments, track 132 may include a series of grooves, indentations, or detents so that visor 130 may be more securely positioned within or along the series of grooves. Visor 130 may then be moved a discrete distance for each new positions, with a predetermined number of positions provided along the length of track 132. In other words, visor 130 may be moved from a first position and "clicked" into a second position.

Visor 130 may be connected to track 132 using any method known in the art. In the embodiments shown in the figures, visor 130 is connected to track 132 using a connector 134. In the embodiment shown in the figures, only one connector 134 is provided at a central location along the length of visor 130. In other embodiments, multiple connectors may be provided, for example if visor 130 is made of a flexible material, where a connecter may be positioned at each end of visor 130.

Figure 4:
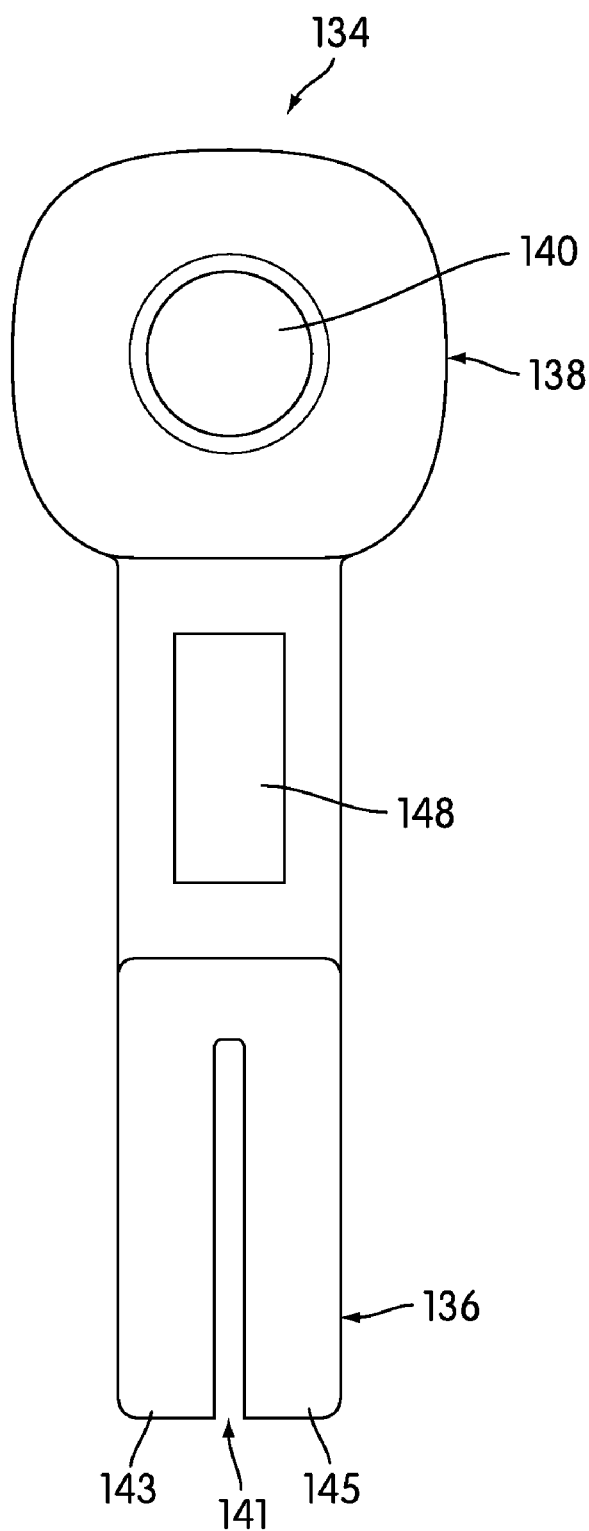
FIG. 4 is a side view of an embodiment of an attachment according to the invention.

In the embodiment shown in the figures, a first end 136 of connector 134 is configured to receive visor 130. In some embodiments, for example the embodiment shown in FIG. 4, visor 130 or a portion of visor 130 may be inserted into a slot 141 formed between a first leg 143 and a second leg 145. Visor 130 may then be secured within slot 141, for example with an adhesive or a mechanical fastener, for example a bolt, rivet, or screw. Preferably, visor 130 is associated with slot 141 so that visor 130 does not move with respect to connector 134 under normal operation conditions. Visor 130 may be fixedly or removably attached within slot 141. In other embodiments, visor 130 may be fixedly or removably attached to first end 136 without inserting visor 130 into a slot, for example by adhering or mechanically affixing visor 130 to a surface of first end 136.

Figure 5:
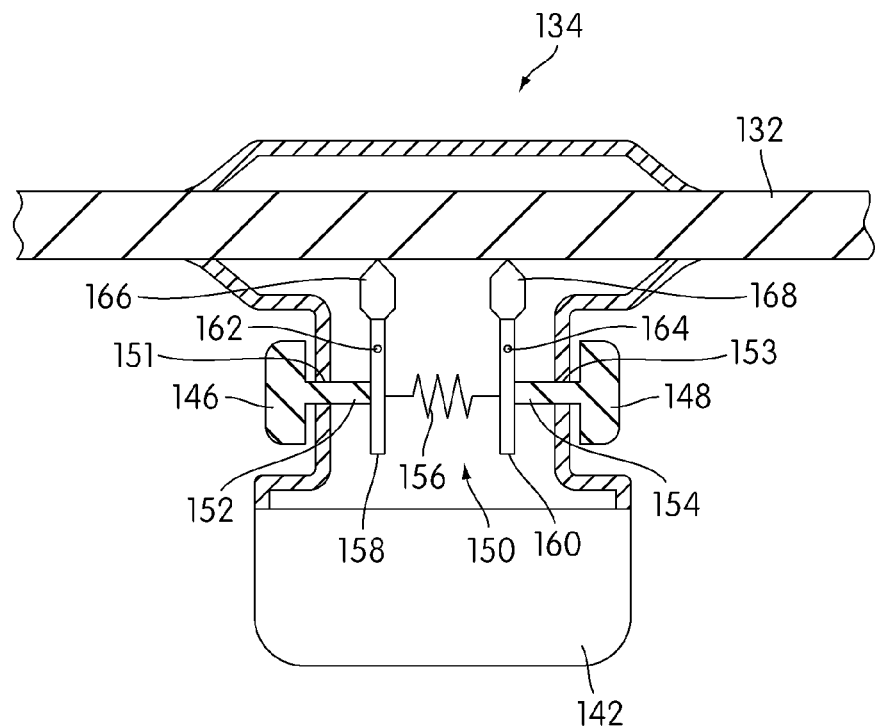
FIG. 5 is a cross-sectional view of an attachment according to the invention in a secured position.
Figure 6:
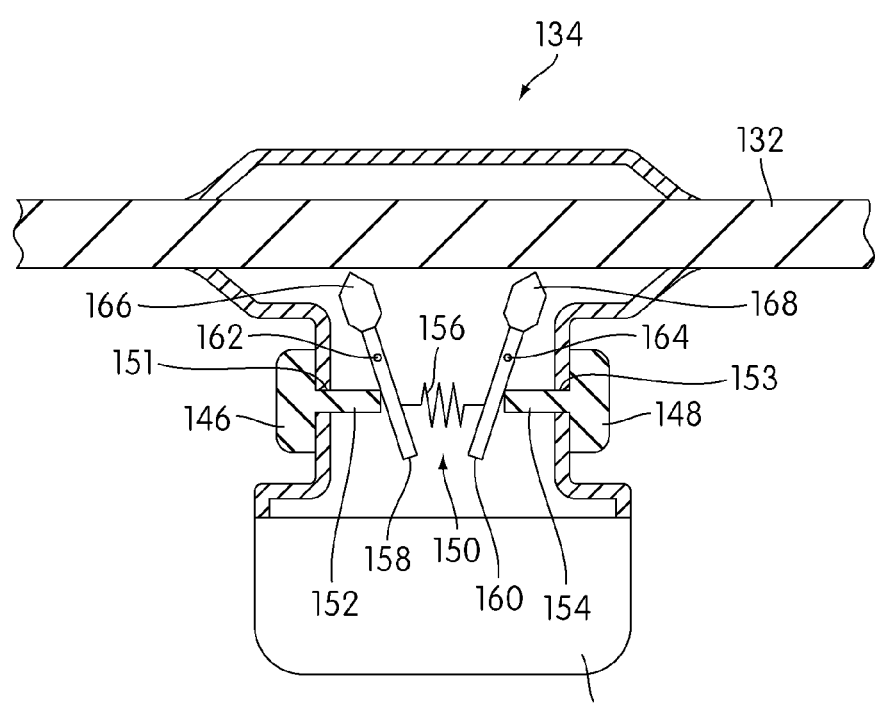
FIG. 6 is a cross-sectional view of the attachment shown in FIG. 5 in an unsecured position.

A second end 138 of connector 134 is configured to be slidingly associated with track 132 using any method known in the art. In some embodiments, second end 138 may be configured to be hung onto or be inserted into track 132. In the embodiment shown in the figures, second end 138 is configured with an opening 140 that is sized and shaped to receive track 132. As shown in FIGS. 5 and 6, opening 140 extends entirely through second end 138 of connector 134. Track 132 passes through opening 140 so that connector 134 may slide along track 132 so that portions of track 132 move through opening 140. This motion allows visor 130 to translate along the length of the window or windows that are co-extensive with track 132.

Connector 134 is preferably provided with a locking mechanism 144, one embodiment of which is shown in FIGS. 5-6. FIG. 5 shows locking mechanism 144 is a closed or locked position, and FIG. 6 shows locking mechanism 144 in an open or sliding position. Locking mechanism 144 may be configured to be finger-operated by a user. In the embodiment shown in the figures, first pushbutton 146 and second pushbutton 148 are provided to allow the user to readily operate locking mechanism 144. In other embodiments, other finger-operable mechanisms may be provided, for example dials, clips, or the like. In the embodiment shown in the figures, an embodiment of a mechanical locking mechanism is shown. In other embodiments, locking mechanism 144 may be electronically and/or magnetically operated.

Locking mechanism 144 generally includes an internal clamping mechanism 150 associated with pushbuttons 146 and 148. Internal clamping mechanism 150 may be any type of mechanism capable of being releasably associated with track 132. In the embodiment shown in the figures, internal clamping mechanism 150 includes a first clamp 158 and a second clamp 160. In other embodiments, only one clamp may be used or three or more clamps. First clamp 158 and second clamp 160 are substantially identical, though in other embodiments, first clamp 158 and second clamp 160 may be different. First clamp 158 includes a first gripping head 166, and second clamp 160 includes a second gripping head 168. Gripping heads 166 and 168 are preferably made from a high friction material, for example an elastomeric material like rubber. First gripping head 166 may have any shape, but preferably has a shape that allows a portion of the gripping head to contact track 132 when pushbuttons 146 and 148 are in a neutral position, but can be easily moved away from track 132 when pushbuttons 146 and 148 are activated. In the embodiment shown in the figures, gripping heads 166 and 168 include a point that contacts track 132 to prevent connector 134 from moving with respect to track 132, and sharp angles leading away from the point to provide clearance when gripping heads 166 and 168 are moved away from track 132. In other embodiments, gripping heads 166 and 168 may have other shapes, for example semicircular or half-moon shapes, cup-like shapes configured to partially surround track 132, or other shapes.

Clamps 158 and 160 may be rotatably attached to an inside surface of connector 134 on a first pivot 162 and second pivot 164, respectively. Pivots 162 and 164 may be pins, dowels, or the like. Clamps 158 and 160 may be biased to the closed or locked position by a biasing spring 156, as shown in FIG. 5. Clamps 158 and 160 may be moved by pushbuttons 146 and 148. In the embodiment shown in the figures, first clamp 158 is associated with first pushbutton 146. In the embodiment shown in the figures, first pushbutton 146 includes a first rod 152 that extends through the housing of connector 134 to rest against first clamp 158. Similarly, second clamp 160 may be associated with second pushbutton 148. In the embodiment shown in the figures, second pushbutton 148 includes a second rod 154 that extends through the housing of connector 134 to rest against second clamp 160.

As shown in FIG. 6, clamps 158 and 160 may be released from track 132 by activating pushbuttons 146 and 148. When pushbuttons 146 and 148 are depressed, rods 152 and 154 press against clamps 158 and 160, respectively. This pressing force causes clamps 158 and 160 to rotate on pivots 162 and 163, respectively, to move gripping heads 166 and 168 away from track 132. In this released position, connector 134 may be moved along track 132 to reposition visor 130. When visor 130 has been moved to the desired position, pushbuttons 146 and 148 are released, and biasing spring 156 expands. The expansion of biasing spring 156 pushes against clamps 158 and 160. Clamps 158 and 160 rotate on pivots 152 and 154, respectively, to return to the locked position against track 132 as shown in FIG. 5.

Opening 140 and track 132 are preferably circular or substantially circular in cross-sectional shape so that connector 134 may rotate about the axis formed by track 132. In other words, connector 134 is also hingedly attached to track 132. In the embodiment shown in the figures, the hinged attachment is provided by track 132 passing through opening 140 so that connector 134 may rotate with respect to track 132. In other embodiments, connector 134 may be hingedly connected to track 132 using any hinge mechanism known in the art, for example a living hinge, a piano hinge, a door hinge, or the like, with one end of the hinge mechanism attached to or formed on connector 134 and the other end of the hinge mechanism attached to or formed on track 132. The rotatable attachment of connector 134 and track 132 allows visor 130 to be rotated on track 132, for example to pivot visor 130 from a stowed position (as shown in FIG. 7) to a shielding position (as shown in FIGS. 8 and 9).

The diameter of opening 140 may be similar to or slightly larger than the diameter of track 132 so that connector 134 may move easily with respect to track 132, and a slightly loose fit of track 132 within opening 140 allows connector 134 to essentially pivot on track 132. In some embodiments, neither opening 140 nor track 132 include any impediments to this rotating motion. In other embodiments, stops, detents, or other limiting mechanisms may be used to control the extent to which connector 134 may rotate on track 132. In the embodiment shown in the figures, pushbuttons 146 and 148 may be used to determine the final angular position of connector 134 on track 132. When pushbuttons 146 and 148 are in a neutral position, as shown in FIG. 5, connector 134 is grips track 132. This gripping inhibits not only the translation of connector 134 along track 132, but also the rotation of connector 134 on track 132. In order to rotate connector 134 on track 132, pushbuttons 146 and 148 are depressed, thereby releasing gripping heads 166 and 168 from contact with track 132, as described above. This frees connector 134 not only to translate or slide along track 132, but also to rotate on track 132. When the desired angular position of connector 134 on track 132 has been reached, pushbuttons 146 and 148 may be released, returning gripping heads 166 and 168 to a position in contact with track 132 to set or lock connector 134 in position. Therefore, any angular position between fully stowed (as shown in FIG. 7) and fully shielding (as shown in FIGS. 8 and 9) may be selected.

FIGS. 7-9 demonstrate the translation and rotation of visor assembly 100 to allow pilot 106 and/or co-pilot 107 to select the position of visor 130 with precision. FIGS. 7-9 show only the co-pilot side of the cockpit for clarity. Those skilled in the art will recognize that visor assembly 100 on the pilot side of the cockpit operates in a similar fashion.

FIG. 7 shows visor 130 in a fully stowed position. In this embodiment, visor assembly 100 is attached to a ceiling 122 of the cockpit. A recess 126 is provided so that visor assembly 100 does not protrude beyond the surface of ceiling 122. Recess 126 is sized and shaped to follow, generally, the contours of visor assembly 100 including visor 130 and track 132. Recess 126 defines the fully stowed position for visor 130, in that recess 126 includes a visor-shaped portion to receive visor 130 when visor 130 is positioned against ceiling 122. Recess 126 is preferably positioned on ceiling 122 so that visor 130 may not interfere or obstruct any ceiling instrument panels 120. When fully stowed, visor 130 is not positioned to shield either front window 110, co-pilot side window 114, or a partition 124 between windows 110 and 114.

FIG. 8 shows a first shielding position for visor 130. In this position, visor 130 has been rotated on track 132 so that a portion of co-pilot window 114 is covered by visor 130. At this point, visor 130 has not been translated along track 132. Because visor 130 is made, in this embodiment, from a panel of tinted plastic or glass, the view through window 114 is not obstructed, but the light or glare from sun 104 may be dissipated.

FIG. 9 shows a second shielding position for visor 130. In this position, visor 130 has been translated, for example by sliding, along track 132 so that a portion of front window 110 is covered by visor 130. Visor 130 has been translated through an angle or point of inflection along the arcuate shape of track 132 as the window changes from side window 114 to front window 110. Visor 130 has not been rotated on track 132 from the position selected in FIG. 8, so that the occupants of the vehicle still view the same side of visor 130 in the position selected in FIG. 9 as the position selected in FIG. 8. Those of skill in the art will recognize that visor 130 may be translated to any position along the length of track 132, and that the position of visor 130 on track 132 is not limited to the positions shown in FIGS. 7-9. Similarly, those of skill in the art will recognize that visor 130 may be rotated to any angular position on track 132, and that the angular position of visor on track 132 is not limited to the fully stowed or fully shielding positions shown in FIGS. 7-9.

In other embodiments, the length of track 132 may be longer or shorter than track 132 as shown in FIGS. 7-9, thereby increasing or decreasing the possible positions for visor 130 on track 132. For example, track 132 may extend along the entirety of the side windows 112 and 114. Additionally, only a single track may be provided, so that one track 132 extends from pilot side window 112, across front window 110, and along at least a portion of co-pilot side window 114. In such an example, one or multiple visors 130 may be associated with the single track 132.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A visor assembly for a vehicle having at least one window, said assembly comprising:
   a visor configured to shield an interior of the vehicle from a light;
   a track extending along at least a portion of the window;
   the track comprising a continuous solid member having a continuous circular cross-sectional shape so that an entirety of an outer surface of the track is smooth along an operable length of the track;
   a connector configured to associate the visor with the track, the connector configured to rotate on the track and translate along the operative length of the track;
   the connector comprising an opening, wherein the opening is configured to receive the track;
   wherein the track is the axis of rotation so that the connector pivots on the track;
   the connector including a locking mechanism;
   the locking mechanism being finger operable;
   the locking mechanism comprising a head rotatably disposed within the connector, the head configured to grip the track; and
   a spring-loaded pushbutton that partially abuts the head;
   wherein depressing the spring-loaded pushbutton moves the head away from the track so that the connector may rotate and translate on the track.

2. The visor assembly of claim 1, wherein the head comprises an elastomeric material.

3. The visor assembly of claim 1, wherein the visor is associated with the connector by a mechanical fastener.

4. The visor assembly of claim 1, wherein the visor is associated with the connector with an adhesive.

5. The visor assembly of claim 1, wherein the connector pivots on the track.

6. The visor assembly of claim 1, wherein the track comprises an elongated element associated with an interior surface of the vehicle.

7. The visor assembly of claim 1, wherein the visor comprises a transparent panel.

8. The visor assembly of claim 1, wherein the visor comprises a translucent panel.

9. The visor assembly of claim 1, wherein the visor comprises an opaque panel.

10. The visor assembly of clam 1, wherein the vehicle comprises an aircraft.

11. The visor assembly of claim 1, wherein the track extends along at least a portion of a front window and a portion of a side window.

12. A visor for a vehicle comprising:
   a panel configured to shield an interior of the vehicle from a light;
   the panel being a continuous portion of material free from bores;
   the panel configured to be rotatably and slidingly attached to a track so that a shielding position of the visor may be selected by a user of the vehicle;
   a connector attaching the panel to the track;
   the connector including a locking mechanism;
   the locking mechanism being finger operable;
   the locking mechanism comprising a head rotatably disposed within the connector, the head configured to grip the track;
   a spring-loaded pushbutton that partially abuts the head;
   wherein depressing the spring-loaded pushbutton moves the head away from the track so that the connector may rotate and translate on the track;
   the connector having a first end with an opening configured to receive the track so that a portion of the track is threaded through the connector; and
   the connector having a second end with a slot configured to receive the panel, wherein the panel is secured within the slot with an adhesive.

13. The visor of claim 12, wherein the panel comprises a tinted translucent portion.

14. The visor of claim 12, wherein the panel comprises an opaque portion.

15. The visor of claim 12, wherein the head comprises an elastomeric material.

16. A vehicle comprising:
   an operator compartment;
   a window;
   a first visor assembly comprising a visor configured to shield an interior of the vehicle from a light, a track that extends at least partially along a length of the window, and a connector that rotatably and slidingly associates the visor with the track;
   the connector having a first end having an opening extending entirely through the first end of the connector, the opening configured to receive a portion of the track so that the connector slides along the track by threading the track through the opening;
   the opening having a substantially circular cross-sectional shape;
   the track having a continuous, substantially circular cross-sectional shape, wherein the diameter of the track is less than the diameter of the opening;
   the track formed from a unitary portion of material;
   the connector configured to rotate on the track, wherein the portion of the track within the opening is the pivot so that the entire connector rotates about the track;
   the connector having a second end having an opening configured to receive the visor, wherein the second end is free from bores
   the connector including a locking mechanism;
   the locking mechanism being finger operable;
   the locking mechanism comprising a head rotatably disposed within the connector, the head configured to grip the track; and
   a spring-loaded pushbutton that partially abuts the head;
   wherein depressing the spring-loaded pushbutton moves the head away from the track so that the connector may rotate and translate on the track.

17. The vehicle of claim 16, wherein the first visor assembly is positioned to shield a first side of the interior of the vehicle,
   a second visor assembly is positioned to shield a second side of the interior of the vehicle from the light,
   wherein the second visor assembly comprises a second visor, a second track that extends at least partially along a length of the window, and a second connector that rotatably and slidingly associates the second visor with the second track.

18. The vehicle of claim 16, further comprising a ceiling of the operator compartment, wherein the track is positioned within a recess formed in the ceiling.

19. The vehicle of claim 16, further comprising a ceiling of the operator compartment, wherein the track is unitary with the ceiling.

20. The vehicle of claim 16, wherein the vehicle comprises an airplane.

21. A visor assembly for a vehicle having at least one window, said assembly comprising:
- a visor configured to shield an interior of the vehicle from a light;
- a track extending along at least a portion of the window;
- a connector configured to associate the visor with the track;
- the connector configured to rotate on the track and translate along the track;
- the connector including a housing, wherein the housing is configured to receive the track;
- the connector including a locking mechanism configured to maintain the position of the connector on the track;
- the locking member including a clamping mechanism within the housing;
- a gripping head positioned within the housing, wherein the gripping head is in frictional contact with the track when the locking mechanism is in a closed position, and wherein the gripping head is rotatable within the housing; and
- the locking member including a pushbutton associated with the gripping head, the pushbutton configured to rotate the gripping head within the housing so that the gripping head is moved away from the track when the locking mechanism is in an open position;
- wherein the clamping mechanism grips the track when the locking mechanism is in a closed position; and
- wherein the clamping mechanism releases the track when the locking mechanism is in an open position.

22. The visor assembly of claim 21, wherein the visor comprises a tinted translucent portion.

23. The visor assembly of claim 21, wherein the pushbutton includes a finger-operable portion positioned on a first side of a wall of the housing and a rod that extends through the wall, wherein the rod abuts the gripping head;
- a spring configured to bias the rod toward the wall;
- wherein depressing the pushbutton compresses the spring and pushes the rod against the gripping head to rotate the gripping head away from the track so that the connector can rotate and translate with respect to the track; and
- wherein releasing the pushbutton allows the spring to expand and bias the rod toward the wall so that the gripping head rotates so that the gripping head is again in frictional contact with the track.

* * * * *